United States Patent

[11] 3,586,217

| [72] | Inventor | William P. Jacobson |
| | | Rockford, Ill. |
| [21] | Appl. No. | 801,062 |
| [22] | Filed | Feb. 20, 1969 |
| [45] | Patented | June 22, 1971 |
| [73] | Assignee | Anderson Bros. Mfg. Co. |
| | | Rockford, Ill. |

[54] MEASURING AND DISPENSING PACKAGE
4 Claims, 5 Drawing Figs.

[52] U.S. Cl. .................................................. 222/457
[51] Int. Cl. ................................................. G01f 11/28
[50] Field of Search ........................................ 222/457, 541, 454—456; 206/56

[56] References Cited
UNITED STATES PATENTS

| 2,707,581 | 5/1955 | Kaplan et al. ............. | 222/541 X |
| 3,137,418 | 6/1964 | Mullen ....................... | 222/457 X |
| 3,398,877 | 8/1968 | Jacobson ..................... | 206/56 X |
| 2,127,417 | 8/1938 | Nelsen ....................... | 222/445 |

*Primary Examiner*—Stanley H. Tollberg
*Assistant Examiner*—Norman L. Stack, Jr.
*Attorney*—McCanna, Morsback, Pillote & Muir

ABSTRACT: A container is formed with an outwardly extending peripheral flange at its open side and with a U-shaped measuring and dispensing channel in the peripheral flange. A cover member overlies the open side of the channel and is sealed to the peripheral flange.

PATENTED JUN22 1971    3,586,217
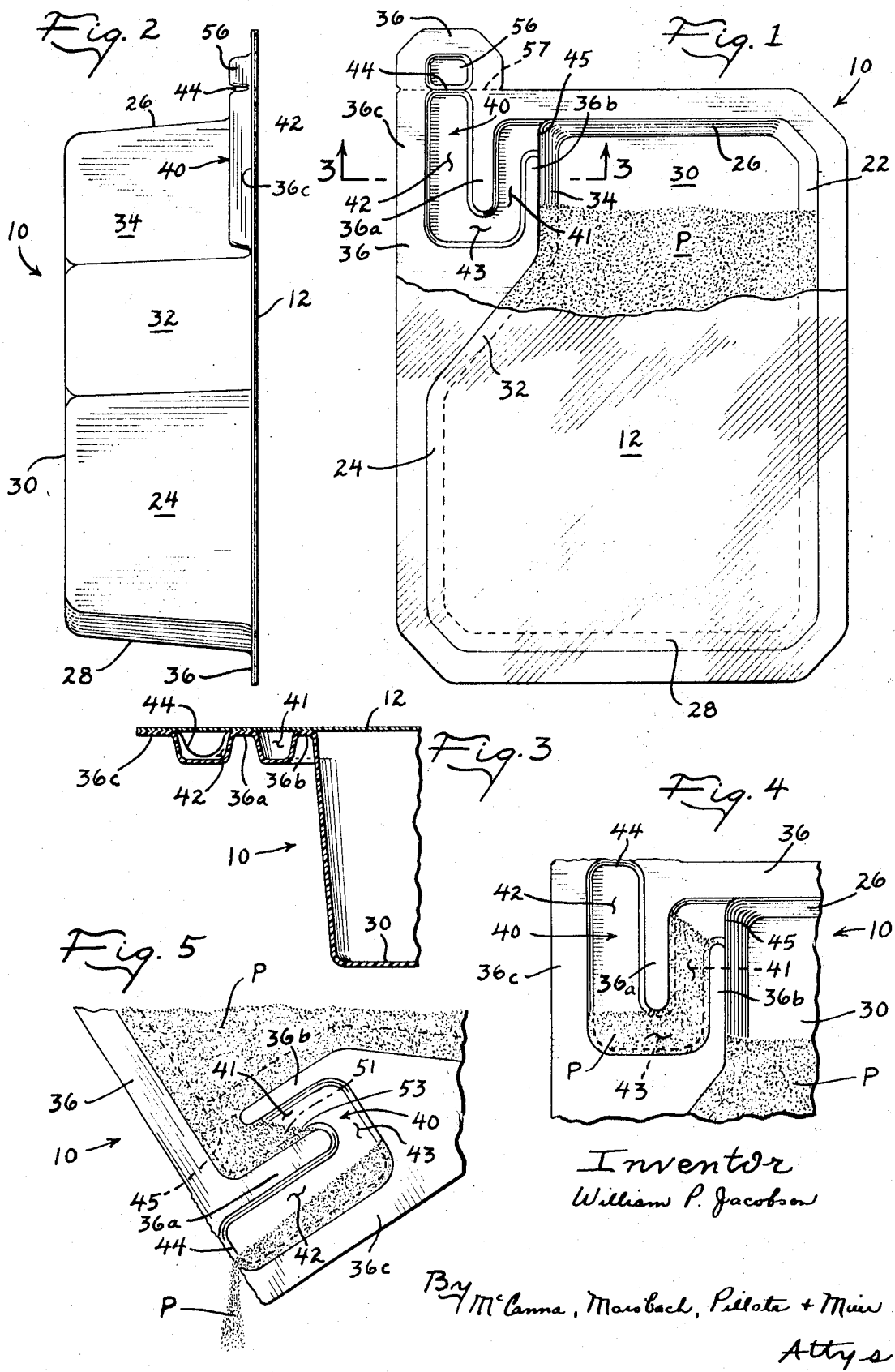
Inventor
William P. Jacobson
By McCanna, Marsbach, Pillote + Muir
Attys 3,586,217

MEASURING AND DISPENSING PACKAGE

BACKGROUND

The invention pertains generally to packages and more particularly to a dispensing package that discharges a predetermined quantity of material in response to tilting of the package.

Dispensing packages that discharge predetermined quantities of material are known. Many are provided with a trap located in the container body; others have a trap in a spout located outwardly of the container body. Containers having outwardly extending peripheral flanges have also been known; but, so far as is known, such containers have not been utilized in dispensing packages of the type of the present invention.

SUMMARY

The present invention relates generally to dispensing packages and more particularly to a dispensing package which discharges measured quantities of material.

The invention is realized by the provision of a container having an outwardly extending peripheral flange and a dispensing channel formed in the flange, and a cover member overlying the flange and sealed thereto to enclose the container body and dispensing channel.

It is a general object of the present invention to provide a dispensing package which includes a container with an outwardly extending peripheral flange.

Another object is to provide a dispensing package with a dispensing channel that is formed integrally with the container.

Still another object is to provide a dispensing container in accordance with the foregoing objects and which is arranged to measure a preselected quantity of material for dispensing.

DRAWING

FIG. 1 is a front elevational view of a preferred embodiment of the invention;

FIG. 2 is a side elevational view as seen from the left of FIG. 1;

FIG. 3 is a partial sectional view on a longer scale taken generally along line 3-3 of FIG. 1; and FIGS. 4 and 5 are longer scale, fragmentary views showing the dispensing channel in upright and tilted position, respectively.

DESCRIPTION

The package includes a container, generally designated 10 and a cover member 12. The container 10 is advantageously made of synthetic resin and has sidewalls 22 and 24, a top wall 26, and a bottom wall 28 all connected to a backwall 30. Intermediate walls 32 and 34 interconnect walls 24 and 26, and are also attached to the backwall 30. The aforedescribed walls define a container body. The container 10 is initially formed generally open at the front and has an outwardly extending peripheral flange 36 surrounding the walls at the open side, or front side of the container. During manufacture, the open side of the container is faced upwardly for filling a product P, such as sugar, into the container and thereafter sealing the cover member 12 to the peripheral flange 36. The cover member 12 is advantageously a material arranged for sealing to the peripheral flange 36 and is preferably transparent so that the dispensing progress can be observed and so that the amount of product P remaining in the container can be readily seen.

A serpentine channel, generally designated 40, is formed in the peripheral flange 36 outwardly of the container body. The channel is generally U-shaped along its length (see FIG. 1) and includes legs 41 and 42 and a bottom portion 43. As can be seen, there are peripheral flange portions 36a—36c on either side of the legs and the cover member 12 is sealed to said peripheral flange portions to enclose the channel (see FIG. 3). An outlet 44 is located at the end of leg 42 and at the end of leg 41 is an inlet 45. The inlet communicates with the container body through wall 34 and adjacent the top wall 26. The bottom portion 43 of the channel 40 provides a reservoir from which a measured amount of product P may be dispensed through the outlet 44 when the package is tilted, as hereafter described.

Referring now to FIGS. 4 and 5, the dispensing operation will be described. Initially, the package will be tilted to a position illustrated in FIG. 5 and the product P will flow through inlet 45 into leg 41 about to line 51 which is the approximate angle of repose from the end of flange portion 36b. The package is then returned to its upright position and the product P will fill the reservoir 43 and excess product will flow back into the container body, while the reservoir 43 and leg 41 remained filled to a point limited by the end of flange portion 36b, as shown in FIG. 4. The reservoir 43 now has an amount of product ready for dispensing. A further tilting of the package to the position of FIG. 5 allows a measured amount of material to be dispensed through outlet 44, as shown, and the abutment formed by flange portion 36a limits the amount of product dispensed by the angle of repose indicated at 53. It can be seen that the dispensing operation automatically refills the leg 41 so that, when returned to the upright position of FIG. 4, an additional quantity of product P is ready for dispensing when the package is again tilted.

The package is initially formed so that the channel 40 is provided with a closure at the outlet 44. In the embodiment illustrated, there is a reduced neck portion at outlet 44 and an enlarged pocket 56 outwardly thereof. By pivoting the packet around line 57, the neck is ruptured to provide outlet 44 for dispensing. This opening feature forms no part of the present invention, but is described and claimed in a copending application assigned to the assignee of this invention. However, in accordance with the present invention, the peripheral flange 36 surrounds the pocket 56 and the cover member 12 overlies the pocket and is sealed to the peripheral flange. In this manner, the package is initially hermetically sealed.

As described above, the container 10 has four walls 22, 24, 26 and 28. When extended, define a rectangle at the front or cover side of the package. Preferably, the discharge channel 40 lies substantially inwardly of the rectangle so defined or, in other words, within the area resulting from the extension of the walls 24 and 26. In this manner, the entire package including the container body and discharge channel 40 can be formed from a substantially rectangular sheet of thermoplastic material and can be easily packaged for shipping, display, and the like.

The embodiments of the invention in which I claim an exclusive property or privilege are defined as follows:

1. In a measuring and dispensing package including a container having a body with an enclosed top, an open side, and a flat, outwardly extending peripheral flange surrounding the body at the open side, and a cover member overlying the open side and peripherally sealed to the peripheral flange to seal the package, the improvement comprising:

a U-shaped discharge channel located entirely in the peripheral flange and formed by a depression therein, the depression having a depth considerably less than the depth of the container, the cover member also being sealed to the flat flange portions to enclose the channel, one end of the channel forming an outlet and the other end forming an inlet communicating with the container body adjacent the top thereof, the bottom of the U providing a reservoir from which a measured amount of material may be dispensed through the outlet when the package is tilted, the flange portion intermediate the legs of the U forming an abutment which limits the amount of material dispensed from the reservoir when the package is tilted, whereby the measured amount is dispensed through the outlet when the package is tilted and the reservoir is refilled when the package is returned upright.

2. The combination of claim 1 wherein: the container has four walls at the periphery of a rectangle at the cover side of the measuring and dispensing package, additional wall means adjacent the discharge channel and lying inwardly of said rectangle, the discharge channel lies inwardly of said rectangle, and the inlet of the discharge channel communicates with the container body at said wall means.

3. A measuring and dispensing package as set forth in claim 1 wherein the channel is initially formed with a closure at the outlet and with the peripheral flange surrounding the closure, and wherein the channel is arranged for severing to provide the outlet for dispensing.

4. The combination of claim 1 wherein the cover member is of generally transparent material whereby the material may be observed during the dispensing operation.